United States Patent [19]

Nijhawan et al.

[11] 3,893,841
[45] July 8, 1975

[54] BONE CHINA

[75] Inventors: Krishan Kumar Nijhawan, Stoke-on-Trent; Derek Taylor, Congleton, both of England

[73] Assignee: Doulton & Co. Limited, London, England

[22] Filed: Oct. 2, 1973

[21] Appl. No.: 402,757

[30] Foreign Application Priority Data
Oct. 10, 1972 United Kingdom............... 46717/72

[52] U.S. Cl.................................. 106/306; 106/45
[51] Int. Cl.............................................. C09c 1/02
[58] Field of Search............................. 106/306, 45

[56] References Cited
UNITED STATES PATENTS
2,263,656  11/1941  Stutz.................................. 106/306
3,241,935  3/1966  Stookey............................... 106/45

Primary Examiner—Winston A. Douglas
Assistant Examiner—J. V. Howard
Attorney, Agent, or Firm—Finnegan, Henderson, Farabow and Garrett

[57] ABSTRACT

A substitute for bone ash suitable for the complete or partial replacement of bone ash in the manufacture of bone china (English porcelain) is obtained by the calcination of a mixture of a calcium phosphate and calcium oxide or a precursor thereof at an elevated temperature to give a sintered product of relatively low surface area and the grinding of said sintered product to form a particulate substance having the required characteristics for use as a bone ash substitute.

8 Claims, No Drawings

BONE CHINA

This invention relates to bone china and is concerned with a synthetically produced substitute for bone ash.

The major constituent employed in the manufacture of bone china (also known as English porcelain) is bone ash, the other constituents being China clay and Cornish stone. Bone ash is a calcined and ground product obtained from cattle bones following the extraction therefrom of glues and is chemically a calcium phosphate which approximates to the formula of hydroxyapatite, namely $Ca_5(PO_4)_3OH$.

Various attempts have hitherto been made to produce a substitute for bone ash but none has given rise to a commercially useful product owing to various problems and disadvantages encountered therewith. In these earlier attempts, three main sources of calcium phosphate have been studied as possible bone ash substitutes, namely dicalcium phosphate, tricalcium phosphate and rock phosphates. It was found that with dicalcium phosphate, a number of drawbacks were encountered including low vitrification temperature for the ware which in production would require changing the glazes and decoration normally employed when using bone ash, and short firing range making the ware highly sensitive to firing temperature and therefore necessitating careful temperature control. With tricalcium phosphate, which was in fact precipitated hydroxyapatite, it was found that the chemical processing of the material made it too expensive for commercial use. Furthermore the product normally obtained by precipitation is very fine-grained with a surface area greater than 20 square metres per gram, compared with the surface area of bone ash which is normally less than 10 square metres per gram. The smaller particle size of the precipitated hydroxyapatite upsets the packing characteristics of the unfired china body and gives rise to higher linear firing contractions, for example 27% compared with typical contractions of 15%. With a bone ash substitute obtained from rock phosphates, the fired colour of the ware was found to be poor owing to the high proportion of impurities such as iron and chromium therein and the translucency of the ware was found to be low. Furthermore before commercial use the material would require defluorination to prevent pollution hazard from the firing of rock phosphate-containing ware.

It is an object of the present invention to provide a complete or partial substitute for bone ash which, because of its properties and cost, will be commercially attractive as an alternative to natural bone ash in the production of bone china.

According to the invention a bone ash substitute is obtained by (a) mixing a calcium phosphate with a calcium substance selected from calcium oxide and compounds which on heating decompose to form calcium oxide; (b) calcining the resulting mixture at a temperature of at least 900°C. so as to form a sintered product having a surface area of less than 5 m.$^2$g.$^{-1}$; and (c) grinding the resulting sintered product to a mean (on a weight percentage basis) particle size in the range of from 0.5 to 10 micrometres ($\mu$m).

The calcium phosphate employed in step (a) may be an anhydrous or hydrated calcium phosphate. Examples of phosphates which may be used are dicalcium phosphate, dicalcium phosphate dihydrate, calcium metaphosphate, calcium pyrophosphate, monocalcium phosphate and monocalcium phosphate monohydrate. As a calcium compound which gives calcium oxide on heating there may be used, for example, calcium carbonate (e.g., limestone) or calcium oxalate. Alternatively, lime (calcium oxide) itself may be used instead of a precursor therefor.

The calcium phosphate and calcium substance are advantageously mixed in proportions such that after the calcining step (b), the Ca:P ratio lies in the range of from 1:1 to 2:1, preferably from 1.5:1 to 1.75:1. The two compounds can be mixed by conventional blending techniques. If desired, a sintering aid, for example sodium carbonate or potassium carbonate, may be incorporated in the mixture.

There may be incorporated in the mixture formed in step (a) a fluxing agent of the type normally employed in the production of bone china, for example nepheline syenite, feldspar or stone, so as to obviate the necessity of subsequent addition of the fluxing agent when the bone ash substitute is used in the production of bone china.

The calcining step (b) is effected at a temperature of at least 900°C. and preferably in the range of from 900° to 1,200°C. in order to produce a sintered product having a surface area of less than 5 m.$^2$g.$^{-1}$ and preferably below 1.0 m.$^2$g.$^{-1}$ (as measured by the B.E.T. nitrogen adsorption technique). The calcination can be carried out by conventional techniques.

The sintered product obtained in step (b) is ground so as to provide particles which will be of a size such that the packing characteristics of an unfired china body containing the bone ash substitute can be controlled and acceptable firing contractions obtained. Thus the sintered product will normally be ground to a mean particle size (on a weight percentage basis) of from 0.5 to 10 $\mu$m (e.s.d.) - equivalent spherical diameter) as determined by the sedimentation technique using a hydrometer. Preferably the bone ash substitute will be ground to a mean particle size in the range of from 2.5 to 3.0 $\mu$m (e.s.d.). The grinding of the sintered product can be carried out by conventional techniques, for example by wet grinding in a ball mill.

The nature of the product obtained by the process described above will depend on the Ca:P ratio employed. Thus the product may be tricalcium phosphate, $Ca_3(PO_4)_2$, either alone or with hydroxyapatite, with or without a small proportion of free lime. Since the Ca:P ratio affects the vitrification temperature of bone china bodies made from the product, variation of the Ca:P ratio can be used to effect control over the firing temperature of the bone china bodies. Hence if desired, the product may be blended with ground limestone in order to increase the Ca:P ratio and hence vary the firing temperature.

The following Examples illustrate the invention.

EXAMPLE 1

Dicalcium phosphate dihydrate and ground limestone were dry blended to form a mixture containing 90.1% by weight of the former and 9.9% by weight of the latter, so as to give after calcination a Ca:P ratio of 1.5:1.

The mixture was calcined in a sagger (fire clay container) at 1,150°C. for one hour. Powder X-ray diffraction examination of the resulting sintered product showed that it contained tricalcium phosphate. The product had the following characteristics:

| | |
|---|---|
| CaO (wt. %) | 52.6 |
| $P_2O_5$ (wt. %) | 45.2 |
| Free lime (wt.% CaO) | 0.2 |
| B.E.T. surface area ($m^2.g.^{-1}$) | 0.5 |

The sintered product was then ground with water in a ball mill until the mean particle size was between 2.5 and 3.0 $\mu$m to provide a product which was then used in place of bone ash in the production of bone china, sufficient limestone being added, if desired, to give a higher Ca:P ratio in the resulting bone china.

EXAMPLE 2

The procedure of Example 1 was repeated but using a starting mixture containing 84.4% by weight of the dicalcium phosphate dihydrate and 15.6% by weight of limestone, so as to give after calcination a Ca:P ratio of 1.65:1 which is similar to natural bone ash.

The sintered product consisted of tricalcium phosphate and hydroxyapatite with some free lime, and had the following characteristics:

| | |
|---|---|
| CaO (wt. %) | 54.9 |
| $P_2O_5$ (wt. %) | 42.2 |
| Free lime (wt.% CaO) | 7.6 |
| B.E.T. surface area ($m^2.g.^{-1}$) | 0.8 |

The sintered product was ground with water in a ball mill until the mean particle size was between 2.5 and 3.0 $\mu$m and the resulting ground product was used as a bone ash substitute in the manufacture of bone china without the addition of any extra limestone.

EXAMPLE 3

The procedure of Example 1 was repeated but using a starting mixture of 81.6% by weight of the dicalcium phosphate dihydrate and 18.4% by weight of limestone, so as to give after calcination a Ca:P ratio of 1.75:1.

The sintered product consisted of tricalcium phosphate and hydroxyapatite with some free lime, and had the following characteristics:

| | |
|---|---|
| CaO (wt. %) | 56.7 |
| $P_2O_5$ (wt. %) | 41.0 |
| Free lime (wt.% CaO) | 13.4 |
| B.E.T. surface area ($m^2.g.^{-1}$) | 0.8 |

The sintered product was ground with water in a ball mill until the mean particle size was between 2.5 and 3.0 $\mu$m and the resulting ground product was used as a bone ash substitute in the manufacture of bone china without the addition of any extra limestone.

EXAMPLE 4

After analysis for $P_2O_5$, CaO and loss on ignition, commercial dicalcium phosphate dihydrate was blended with ground limestone of particle size less than 300 mesh (B.S.S.) to give a mixture containing 84% by weight of the former and 16% by weight of the latter, which mixture gives a Ca:P ratio of 1.5:1 after calcination.

The mixture was loaded into saggers and subjected to calcination by firing through a tunnel kiln. The calcination consisted of a substantially linear temperature rise to 1,150°C. over 48 hours, holding at this temperature for 2 hours, and then cooling over 24 hours.

The resulting sintered product was ground by wet-milling in a ball mill until the particle size, measured by the hydrometer technique, was 50% less than 2.7 $\mu$m.

The resulting ground product was then used as a bone ash substitute in an otherwise conventional bone china formulation. The workability of plastic bodies made from this formulation did not differ from that of plastic bodies made from a conventional bone china formulation.

EXAMPLE 5

A mixture of 88.5 % by weight of dicalcium phosphate dihydrate and 11.5% by weight of ground limestone was formed by blending wet in a ball mill for a short time, so as to mix the two materials without much grinding taking place. This mixture gives a Ca:P ratio of 1.5:1 after calcination.

The resulting slurry mixture was dried and then fed into a calcination kiln of the type normally used for the calcination of bone ash. Calcination was carried out for about 1 hour at 1,150°C. The resulting sintered product consisted of tricalcium phosphate and had the following characteristics:

| | |
|---|---|
| CaO (wt. %) | 52.5 |
| $P_2O_5$ (wt. %) | 45.5 |
| Free lime (wt.% CaO) | <0.05 |
| B.E.T. surface area ($m^2.g.^{-1}$) | 0.27 |

The sintered product was ground by wet-milling in a ball-mill to a mean particle size of 50% between 2.5 and 3.0 $\mu$m.

The ground product so obtained was then blended with ground limestone to give a mixture containing 91.2% by weight of the ground product and 8.8% by weight of the limestone, the mixture having a Ca:P ratio of 1.65:1. The mixture so obtained was then used as a bone ash substitute in the manufacture of bone china.

What is claimed is:

1. A synthetic bone ash substitute suitable for use as a complete or partial replacement for bone ash in the manufacture of bone china by conventional pottery methods, being the product obtainable by (a) producing a mixture consisting essentially of a calcium phosphate and a calcium substance selected from calcium oxide and compounds which on heating decompose to form calcium oxide, said calcium phosphate and said calcium substance being mixed in proportions such that after the subsequent calcining step (b), the Ca:P ratio lies in the range of from 1:1 to 2:1; (b) calcining said mixture at a temperature of at least 900°C. so as to form a sintered product having a surface area of less than 5 $m.^2g.^{-1}$; and (c) grinding the resulting sintered product to a mean particle size in the range of from 0.5 to 10$\mu$m to obtain the required product.

2. A bone ash substitute as claimed in claim 1, wherein the Ca:P ratio lies in the range of from 1.5:1 to 1.75:1.

3. A bone ash substitute as claimed in claim 1, wherein the calcining step (b) is effected at a temperature in the range of from 900° to 1,200°C.

4. A bone ash substitute as claimed in claim 1, wherein the sintered product has a surface area below 1.0 $m.^2g.^{-1}$.

5. A bone ash substitute as claimed in claim 1, wherein the sintered product is ground in step (c) to a mean particle size in the range of from 2.5 to 3.0 μm.

6. A bone ash substitute as claimed in claim 1, wherein the calcium phosphate is dicalcium phosphate dihydrate and the calcium substance is calcium carbonate.

7. A bone ash substitute as claimed in claim 1, wherein after step (c) ground limestone is blended with said required product in order to increase the Ca:P ratio.

8. Bone china comprising china clay, cornish stone and the bone ash substitute of claim 1.

* * * * *